US011036222B2

(12) United States Patent
Belloni Mourao et al.

(10) Patent No.: US 11,036,222 B2
(45) Date of Patent: Jun. 15, 2021

(54) AUTONOMOUS ANALYSIS OF THE DRIVER'S BEHAVIOR

(71) Applicant: INTERNATIONAL BUSINESS MACHINES CORPORATION, Armonk, NY (US)

(72) Inventors: Hima Carla Belloni Mourao, Campinas (BR); Fernando A. Cavalcanti, Belo Horizonte (BR); Marcos Vinicius L. Paraiso, Campinas (BR); Daniel de Paula Turco, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 15/965,033

(22) Filed: Apr. 27, 2018

(65) Prior Publication Data
US 2019/0332106 A1 Oct. 31, 2019

(51) Int. Cl.
G05D 1/00 (2006.01)
B60W 50/14 (2020.01)
B60W 50/12 (2012.01)

(52) U.S. Cl.
CPC ........... G05D 1/0061 (2013.01); B60W 50/12 (2013.01); B60W 50/14 (2013.01); G05D 1/0077 (2013.01);
(Continued)

(58) Field of Classification Search
USPC .......................................................... 701/23
See application file for complete search history.

(56) References Cited

U.S. PATENT DOCUMENTS 7,962,342 B1* 6/2011 Coughian ............... G10L 15/22
704/270.1
8,370,027 B2 2/2013 Pettersson et al.
(Continued)

FOREIGN PATENT DOCUMENTS

CN 201559535 U 8/2010
CN 101844516 A 9/2010
(Continued)

OTHER PUBLICATIONS

CDC, "Impaired Driving: Get the Facts," CDC Injury Center: Motor Vehicle Safety, Last Updated Jun. 16, 2017, p. 1-4, Centers for Disease Control and Prevention, https://www.cdc.gov/motorvehiclesafety/impaired_driving/impaired-drv_factsheet.html, Accessed on Apr. 24, 2018.

(Continued)

Primary Examiner — James M McPherson
(74) Attorney, Agent, or Firm — Ewa M. Wozniak

(57) ABSTRACT

A method, computer system, and a computer program product for implementing a plurality of actions associated with an impaired driver to prevent vehicle accidents is provided. The present invention may include collecting, from a plurality of existing vehicle sensors and a plurality of existing portable user device sensors, a plurality of data. The present invention may also include analyzing the collected plurality of data. The present invention may then include determining an impairment state associated with the driver. The present invention may further include implementing the plurality of actions to prohibit the driver from operating the vehicle. The present invention may then include storing the implemented plurality of actions, the analyzed plurality of data, and the determined impairment state associated with the driver in a historical database.

20 Claims, 9 Drawing Sheets

(52) U.S. Cl.
CPC ... *B60W 2050/143* (2013.01); *B60W 2540/21* (2020.02); *B60W 2540/24* (2013.01); *B60W 2710/06* (2013.01); *B60W 2720/10* (2013.01)

(56) References Cited

U.S. PATENT DOCUMENTS

| | | | |
|---|---|---|---|
| 9,067,565 | B2 | 6/2015 | McClellan et al. |
| 9,280,145 | B2 | 3/2016 | Hannon |
| 9,440,657 | B1 | 9/2016 | Fields et al. |
| 9,500,865 | B2 | 11/2016 | Chen |
| 10,525,979 | B1* | 1/2020 | Grant ............... B60Q 9/00 |
| 2010/0268425 | A1* | 10/2010 | Pettersson ......... B60K 28/063 701/45 |
| 2016/0016590 | A1 | 1/2016 | Fernandez Pozo et al. |
| 2016/0339922 | A1* | 11/2016 | Schmidt ........... B60W 40/08 |
| 2017/0021764 | A1* | 1/2017 | Adams ............. G07C 5/0841 |
| 2017/0096146 | A1* | 4/2017 | Jones .............. B60W 40/08 |
| 2017/0166054 | A1* | 6/2017 | Ayala Rodriguez ............ A61B 5/0077 |
| 2018/0037228 | A1* | 2/2018 | Biondo ............ B60W 30/18 |
| 2018/0201131 | A1* | 7/2018 | Shen ............... B60K 28/066 |

FOREIGN PATENT DOCUMENTS

| | | |
|---|---|---|
| JP | 2007186124 A | 7/2007 |
| WO | 2011100897 A1 | 8/2011 |

OTHER PUBLICATIONS

Chang, "Could the new Driver Alcohol Detection System for Safety (DADSS) save 10,000 lives?," Digital Trends, Jun. 8, 2015, p. 1-4, Designtechnica Corporation, https://www.digitaltrends.com/cars/a-permanent-end-to-drunk-driving-may-be-possible-with-the-driver-alcohol-detection-system-for-safety/, Accessed on Apr. 24, 2018.

Guerrini, "BMW Partners With IBM to Add Watson's Cognitive Computing Capabilities to Its Cars," Forbes Tech, Dec. 15, 2016, p. 1-3, https://www.forbes.com/sites/federicoguerrini/2016/12/15/bmw-partners-with-ibm-to-add-watsons-cognitive-computing-capabilities-to-its-cars/#426666fe1a90, Accessed on Apr. 24, 2018.

Mandalkar et al., "Alcohol Detection and Accident Avoidance Using Locking With Tracking," International Journal of Advance Research in Computer Science and Management Studies, Sep. 2015, p. 142-147, vol. 3, Issue 9.

Mell et al., "The NIST Definition of Cloud Computing," National Institute of Standards and Technology, Sep. 2011, p. 1-3, Special Publication 800-145.

NHTSA, "U.S. Dot Urges Public to 'Drive Sober or Get Pulled Over' and Announces Funding for Innovative Technology to End Drunk Driving," National Highway Traffic Safety Administration Press Release, Dec. 14, 2016, p. 1-5, https://www.nhtsa.gov/press-releases/us-dot-urges-public-%E2%80%98drive-sober-or-get-pulled-over%E2%80%99-and-announces-funding-innovative, Accessed on Apr. 24, 2018.

Nissan, "Drunk-Driving Prevention Concept Car," Nissan Future Technology, p. 1-2, Nissan Motor Corporation, https://www.nissan-global.com/EN/TECHNOLOGY/OVERVIEW/dpcc.html, Accessed on Apr. 24, 2018.

Shah et al., "ARM Based Drunk Driver Identification with Tracking System," International Journal of Modern Trends in Engineering and Research (IJMTER), Apr. 2016, p. 302-307, vol. 3, Issue 4.

Wechsler, "How Police Visually Detect Drunk Drivers," The Law, p. 1-4, https://www.thelaw.com/law/how-police-visually-detect-drunk-drivers.185/, Accessed on Apr. 24, 2018.

* cited by examiner

AUTONOMOUS ANALYSIS OF THE DRIVER'S BEHAVIOR

BACKGROUND

The present invention relates generally to the field of computing, and more particularly to electronically implemented vehicle safety and traffic measures.

One of the most common causes of vehicle accidents are vehicles operated by drivers who are driving while intoxicated (DWI), or driving under the influence (DUI) (i.e., impaired drivers). According to the United States Department of Transportation and the National Highway Traffic Safety Administration, in the United States, approximately 28 people die per day (or one death every 53 minutes) from vehicle accidents involving an impaired driver.

SUMMARY

Embodiments of the present invention disclose a method, computer system, and a computer program product for implementing a plurality of actions associated with an impaired driver to prevent vehicle accidents. The present invention may include collecting, from a plurality of existing vehicle sensors and a plurality of existing portable user device sensors, a plurality of data associated with a driver of a vehicle. The present invention may also include analyzing the collected plurality of data from the plurality of existing vehicle sensors and the plurality of existing portable user device sensors. The present invention may then include determining an impairment state associated with the driver based on the analyzed plurality of data. The present invention may further include implementing the plurality of actions, based on the determined impairment state of the driver, to prohibit the driver from operating the vehicle in the determined impairment state. The present invention may then include storing the implemented plurality of actions, the analyzed plurality of data from the plurality of existing vehicle sensors and the plurality of existing portable user device sensors, and the determined impairment state associated with the driver in a historical database.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
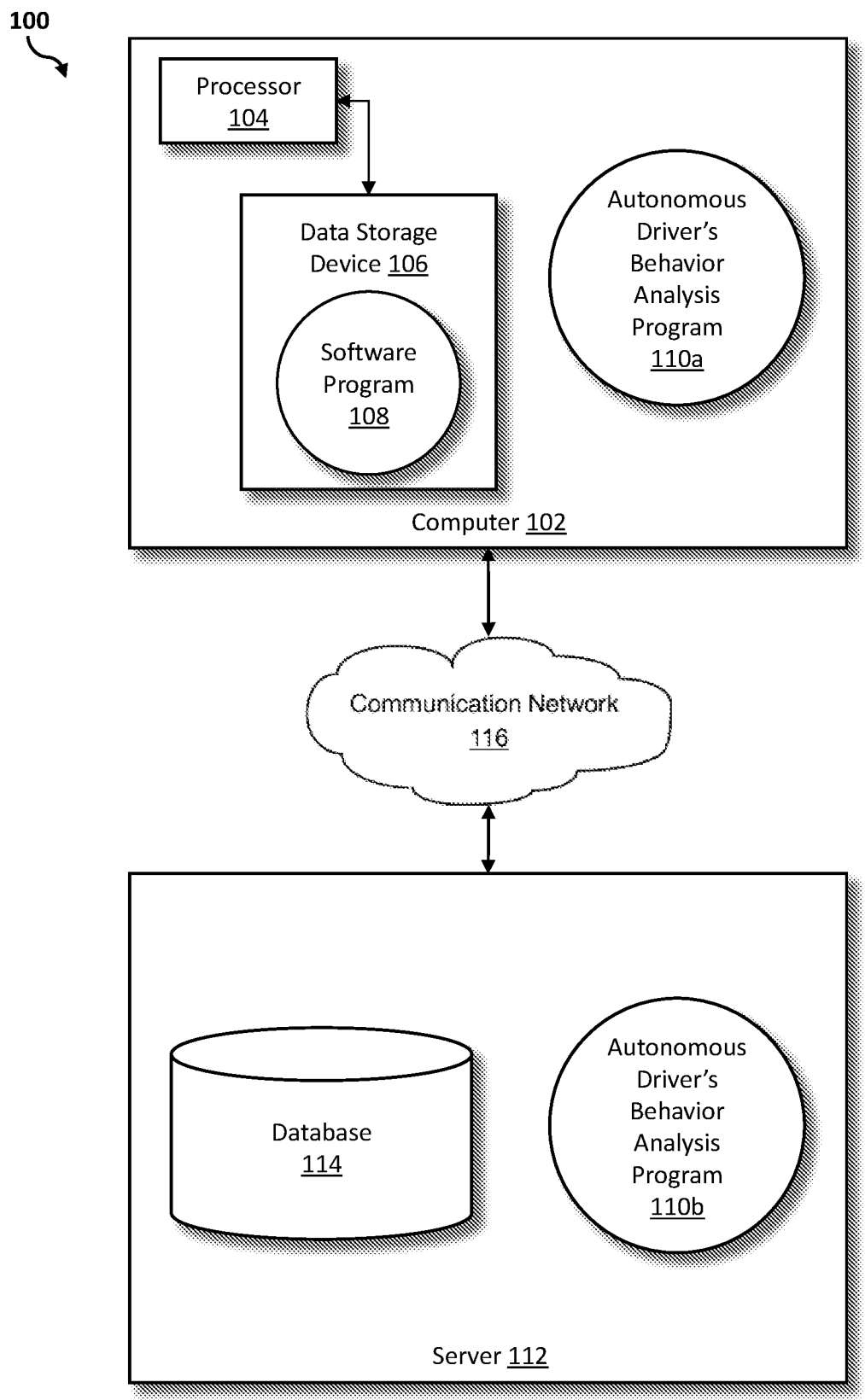
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for implementing a plurality of actions associated with an impaired driver to prevent vehicle accidents. As such, the present embodiment has the capacity to improve the technical field of electronically implemented vehicle safety and traffic measures by leveraging existing sensors in modern vehicles to prevent a vehicle accident when the driver of the vehicle is impaired. More specifically, the autonomous driver's behavior analysis program may collect data from existing sensors associated with the vehicle and portable user device located in the vehicle. The autonomous driver's behavior analysis program may then determine whether the driver of the vehicle exhibits behavior indicative of a low or high level of impairment. Then, the autonomous driver's behavior analysis program may trigger actions based on the level of impairment exhibited by the driver to prevent a vehicle accident due to the driver's impaired state.

As previously described, one of the most common causes of vehicle accidents are vehicles operated by drivers who are driving while intoxicated (DWI), or driving under the influence (DUI) (i.e., impaired drivers). According to the United States Department of Transportation and the National Highway Traffic Safety Administration, in the United States, approximately 28 people die per day (or one death every 53 minutes) from vehicle accidents involving an impaired driver. Drivers with a blood alcohol content (BAC) of 0.08% or higher are seven times more likely than drivers with no alcohol in their systems to be involved in fatal vehicle accidents. As such, the annual cost of alcohol related vehicle accidents total more than $44 billion annually.

The NHTSA compiled over 100 visual cues for spotting an impaired driver. The list of visual cues of DUI/DWI are categorized into four major signs: (1) problems maintaining proper lane position; (2) speed and braking difficulties; (3) vigilance problems; and (4) judgment problems. These four signs indicate at least a 35% chance of a motor vehicle operator being impaired.

While all vehicle accidents cannot be avoided, a majority of vehicle accidents involving impaired drivers often can be avoided. Currently, education and external systems or devices (e.g., preventing a vehicle from starting if the driver is intoxicated, analyzing a driver's condition) are utilized to detect impaired drivers and thereby prevent vehicle accidents. Additionally, police officers may utilize various methods, such as vehicle speed, tailgating (e.g., following a vehicle in the front too closely), failure to follow traffic rules (e.g., illegal turns or driving in an improper lane), or erratic or unsafe lane changes, to detect impaired drivers. However, there is a need for a solution that automatically evaluates if a driver is impaired without the need to install specialized hardware or sensors in a vehicle.

Therefore, it may be advantageous to, among other things, leverage the existing sensors presented in modern vehicles along with smart phone technologies thereby allowing for instant mass adoption. Such a method would consume the available sensor's data to determine the probability of impairment of the driver, and use passive or active actions to prevent the impaired driver from continuing to operate the vehicle.

According to at least one embodiment, the autonomous driver's behavior analysis program may include utilizing different types of inputs (e.g., existing vehicle sensors, global positioning system (GPS), smart phone information, driver's historical data), which may be analyzed by the vehicle's existing onboard computer that already exists in modern vehicles and a device associated with the driver (e.g., smart phone) without the need to install third-party devices in the vehicle. The data analyzed by the vehicle's existing onboard computer may be ranked and, depending on the results, actions ranging from a simple warning to the driver to a forced stopping of the vehicle may be applied.

The present embodiment may include the use of GPS to obtain the geo-location of a vehicle. By the location, the autonomous driver's behavior analysis program may learn specific venues for bars, night clubs or social events in which people consume alcohol, which may be utilized to analyze the driver's behavior. For example, if the driver is temporarily in an area where several bars are located and exhibits erratic behavior after the driver resumes to drive the vehicle, then, based on the location of the stop and data analyzed by the vehicle's onboard computer, the autonomous driver's behavior analysis program may create a ranking with the probabilities that the driver is impaired. Then, the autonomous driver's behavior analysis program may take the appropriate action based on the identified behavior.

According to at least one embodiment, the autonomous driver's behavior analysis program may include alerting the driver of a possible impairment state and asking the driver for a verbal confirmation. The autonomous driver's behavior analysis program may then utilize voice detection algorithms to confirm if the driver is impaired or not.

According to at least one embodiment, the autonomous driver's behavior analysis program may send a notification to at least one predefined phone number of a relative or friend to notify the driver's relative or friend of the identified behavior of the driver. The present embodiment may include reducing the vehicle's speed or even stopping the vehicle, when the impairment rate crosses a predefined threshold.

According to at least one embodiment, the autonomous driver's behavior analysis program may detect the impaired driver's behavior by utilizing sensors and features already available in modern vehicles without the need for installing extra devices. The information collected from the vehicles may be analyzed and enriched with other data (e.g., geo location (GPS) to determine nearby events and locations that are attention zones, such as bars, lounges and night clubs). In the present embodiment, the autonomous driver's behavior analysis program may create and utilize a historical database to assist with the detection of similar situations when the driver was impaired.

According to at least one embodiment, the autonomous driver's behavior analysis program may utilize an algorithm to detect the impairment state of the driver based on a list of visual cues used by police officers throughout the United States to detect drivers under the influence (e.g., impaired drivers) without the need for a blood test. The visual cues may include (1) problems maintaining proper lane position (i.e., failure to stay within one's driving lane on the road); (2) speed and braking difficulties (i.e., failure to maintain proper speed, sudden acceleration and braking); (3) judgment problems (i.e., inability to judge the road and proximity to objects, such as jerky or sharp turns, sudden movements and over-correction of steering); and (4) vigilance problems (i.e., failure to pay attention to the surroundings and changing driving conditions).

The present embodiment may include a set of sensors that may assist with the determination that a driver is impaired. For example, the sensors that may be available include speed signal, engine revolution per mile (RPM) signal, accelerator pedal position signal, anti-lock brake sensor, steering angle signal, changing lane detection, crash sensor, front and back position sensor, GPS and onboard computer (i.e., may be utilized to perform the data analysis and apply the necessary action to the driver to prevent an accident).

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an autonomous driver's behavior analysis program 110a. The networked computer environment 100 may also include a server 112 that is enabled to run an autonomous driver's behavior analysis program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the autonomous driver's behavior analysis program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the autonomous driver's behavior analysis program 110a, 110b (respectively) to detect an impaired driver and trigger predefined actions to the vehicle operated by the impaired driver. The autonomous driver's behavior analysis method is explained in more detail below with respect to FIGS. 2-4C.

Figure 2:
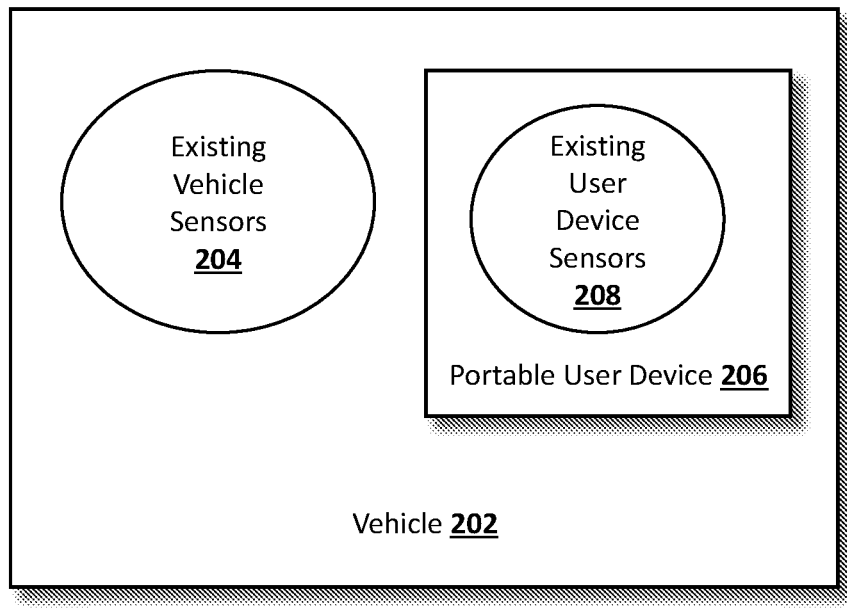
FIG. 2 illustrates a vehicle sensor environment according to at least one embodiment.

Referring now to FIG. 2, an exemplary vehicle sensor environment 200 in accordance with one embodiment is depicted. As shown, the vehicle sensor environment 200 comprises a vehicle 202 and portable user device 206 (i.e., existing portable driver device). The existing vehicle sensors 204 associated with the autonomous driver's behavior analysis program 110a, 110b (i.e., onboard vehicle sensors) may be located inside each vehicle 202. The specific location or acceptable types of existing vehicle sensors 204 within the vehicle 202 may depend on the specific manufacturer of the vehicle 202 associated with the existing vehicle sensor 204. While the vehicle 202 is in motion, the autonomous driver's behavior analysis program 110a, 110b may collect real-time information, via the existing vehicle sensors 204, on the behavior of the driver within the vehicle 202 and roads travelled by the vehicle 202.

Additionally, existing user device sensors 208 associated with the autonomous driver's behavior analysis program 110a, 110b may be installed in each portable user device 206 (e.g., smart phone). The portable user device 206 may be associated with the user (i.e., driver) of the vehicle 202. The specific location or acceptable types of existing user device sensors 208 utilized by the portable user device 206 may depend on the type of portable user device 206 and the specific manufacturer of the portable user device 206. To properly utilize the autonomous driver's behavior analysis program 110a, 110b, the portable user device 206 may be located or installed inside of the vehicle 202. While the vehicle 202 is in motion, the autonomous driver's behavior analysis program 110a, 110b may collect real-time information, via the existing user device sensors 208, on the behavior of the driver within the vehicle 202 and roads travelled by the vehicle 202.

Figure 3:
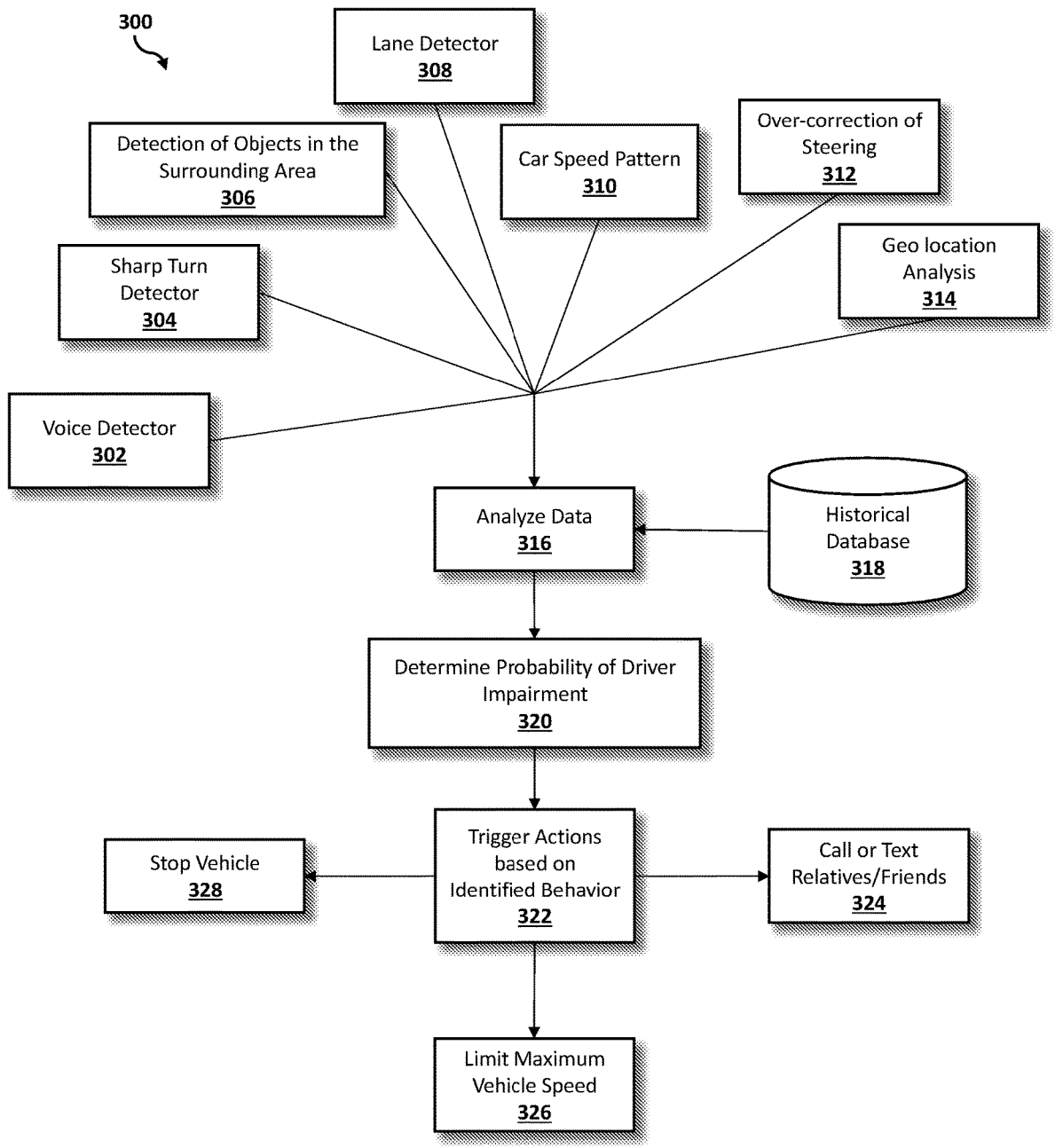
FIG. 3 is an operational flowchart illustrating a process for autonomous driver's behavior analysis according to at least one embodiment.

Referring now to FIG. 3, an operational flowchart illustrating the exemplary autonomous driver's behavior analysis process 300 used by the autonomous driver's behavior analysis program 110a, 110b according to at least one embodiment is depicted.

At 316, the autonomous driver's behavior analysis program 110a, 110b analyzes the data associated with a driver's behavior that is received from the existing vehicle sensors 204, the existing user device sensors 208 and a historical database 318. The data received from existing vehicle sensors 204 includes sharp turn detector 304, detection of objects in the surrounding area 306, lane detector 308, car speed pattern 310 and over-correction of steering 312. The data from existing user device sensors 208 includes voice detector 302 and geo-location analysis 314. Additionally, the data associated with the historical database 318 may include historical data associated with a specific driver on past events in which the driver may or may not have been impaired. The historical database 318 may include the determination of the autonomous driver's behavior analysis program 110a, 110b, as well as the data collected and analyzed that is associated with the driver during a specific past event or instance.

For example, the autonomous driver's behavior analysis program 110a, 110b analyzes data collected on Driver A, who, according to the collected data, is driving close to parked vehicles based on a detection of objects in the surrounding area 306 and exhibits no distortion in speech based on the voice detector 302. The historical database 318 also reviews the past similar behavior of Driver A in which Driver A exhibited no speech distortions and was driving close to parked vehicles.

Then, at 320, the probability of driver impairment is determined. Based on the analyzed data, the autonomous driver's behavior analysis program 110a, 110b may utilize mathematical algorithms to determine the probability of driver impairment, and to identify the behavior of the driver.

Continuing the previous example, the autonomous driver's behavior analysis program 110a, 110b determines that Driver A exhibits no impairment.

Then, at 322, actions are triggered based on the identified behavior of the driver by the autonomous driver's behavior analysis program 110a, 110b. The actions may be predefined by the user, and may include calling or sending a text to the driver's specific relatives or friends 324, limiting the maximum vehicle speed 326 and stopping the vehicle 328.

Continuing the previous example, if Driver A exhibits behavior indicative of low or high impairment, then the autonomous driver's behavior analysis program 110a, 110b will trigger predefined actions previously determined by Driver A, or default actions determined by the autonomous driver's behavior analysis program 110a, 110b based on the specific manufacturer of the vehicle 202.

In the present embodiment, the autonomous driver's behavior analysis program 110a, 110b may utilize a computer display monitor existing in the vehicle 202. A screen may appear in which, for example, a "Settings" button is located on the bottom right side. Once the owner or operator of the vehicle 202 clicks on the "Settings" button, the owner or operator of the vehicle 202 (i.e., driver) may be prompted (e.g., via dialog box) to indicate the setting that the owner or operator of the vehicle 202 intends to change. In the list of settings, there may be an "Action" button. If the owner or operator of the vehicle 202 clicks the "Action" button, then the dialog box may expand the list of possible actions (e.g., call or text relatives/friends 324, limit maximum vehicle speed 326, stop vehicle 328) that may be implemented by the specific vehicle 202. The owner or operator of the vehicle 202 may select the preferred action. The dialog box may expand and prompt the owner or operator of the vehicle 202 to confirm the action selection by clicking the "Yes" or "No" buttons under a statement restating the selected action. Once the vehicle owner or operator clicks "Yes," the dialog box may disappear. If, however, the vehicle owner or operator selects the "No" button, then the dialog box may remain for the owner or operator of the vehicle 202 to clarify the selected action.

In the present embodiment, the autonomous driver's behavior analysis program 110a, 110b may be utilized to trigger various types of actions based on the identified behavior of the driver. The types of actions implemented by the autonomous driver's behavior analysis program 110a, 110b may depend on the specific manufacturer of the vehicle 202.

In the present embodiment, the autonomous driver's behavior analysis program 110a, 110b may utilize a computer display monitor existing in the vehicle 202. A screen may appear in which, for example, a "Settings" button is located on the bottom right side. Once the owner or operator of the vehicle 202 clicks on the "Settings" button, the owner or operator of the vehicle 202 may be prompted (e.g., via dialog box) to indicate the setting that the owner or operator of the vehicle 202 intends to change. In the list of settings, there may be an "Action" button. If the owner or operator of the vehicle 202 clicks the "Action" button, then the dialog box may expand the list of possible actions that may be implemented by the specific vehicle 202. If the owner or operator of the vehicle 202 selects "Call or Text Friends/Relatives," then the dialog box may expand and prompt the owner or operator of the vehicle 202 to input the name, relationship, phone numbers and preferred means of communication (e.g., text message, call) for the driver's preferred contact person. The owner or operator of the vehicle 202 may enter at least one preferred contact person. The dialog box may expand and prompt the owner or operator of the vehicle 202 to confirm the preferred contact person by clicking the "Yes" or "No" buttons under a statement restating the entered preferred contact person. Once the vehicle owner or operator clicks "Yes," the dialog box may disappear. If, however, the vehicle owner or operator selects the "No" button, then the dialog box may remain for the owner or operator of the vehicle 202 to clarify the entered preferred contact person.

Alternatively, the autonomous driver's behavior analysis program 110a, 110b may upload the preferred contact person via the portable user device 206 (e.g., user's smart phone). The autonomous driver's behavior analysis program 110a, 110b may utilize a computer display monitor existing in the vehicle 202. A screen may appear in which, for example, a "Settings" button is located on the bottom right side. Once the owner or operator of the vehicle 202 clicks on the "Settings" button, the owner or operator of the vehicle 202 may be prompted (e.g., via dialog box) to indicate the setting that the owner or operator of the vehicle 202 intends to change. In the list of settings, there may be an "Action" button. If the owner or operator of the vehicle 202 clicks the "Action" button, then the dialog box may expand the list of possible actions that may be implemented by the specific vehicle 202. If the owner or operator of the vehicle 202 selects "Call or Text Friends/Relatives," then the dialog box may expand and, at the bottom of the dialog box, there may be a "Upload" button. If the owner or operator of the vehicle 202 clicks the "Upload" button, then the contact list associated with the portable user device 206 (e.g., user's smart phone) may be uploaded onto the computer display monitor and another dialog box with the contact list on the portable user device 206 (e.g., smart phone) may appear on the computer display monitor. The owner or operator of the vehicle 202 may then click on each contact in the contact list on the portable user device 206 that the owner or operator of the vehicle 202 intends to include as a preferred contact person. Once the owner or operator of the vehicle 202 selects at least one preferred contact person, then the dialog box may disappear and the owner of operator of the vehicle 202 may be prompted (e.g., via dialog box) to include another preferred contact person or to close all dialog boxes.

In the present embodiment, each preferred contact person entered by the driver of the vehicle 202 may be utilized to generate a predefined list for the driver. The autonomous driver's behavior analysis program 110a, 110b may warn the contact person or contact people included on the predefined list if the driver exhibits a low level of impairment while operating the vehicle 202.

Figure 4A:
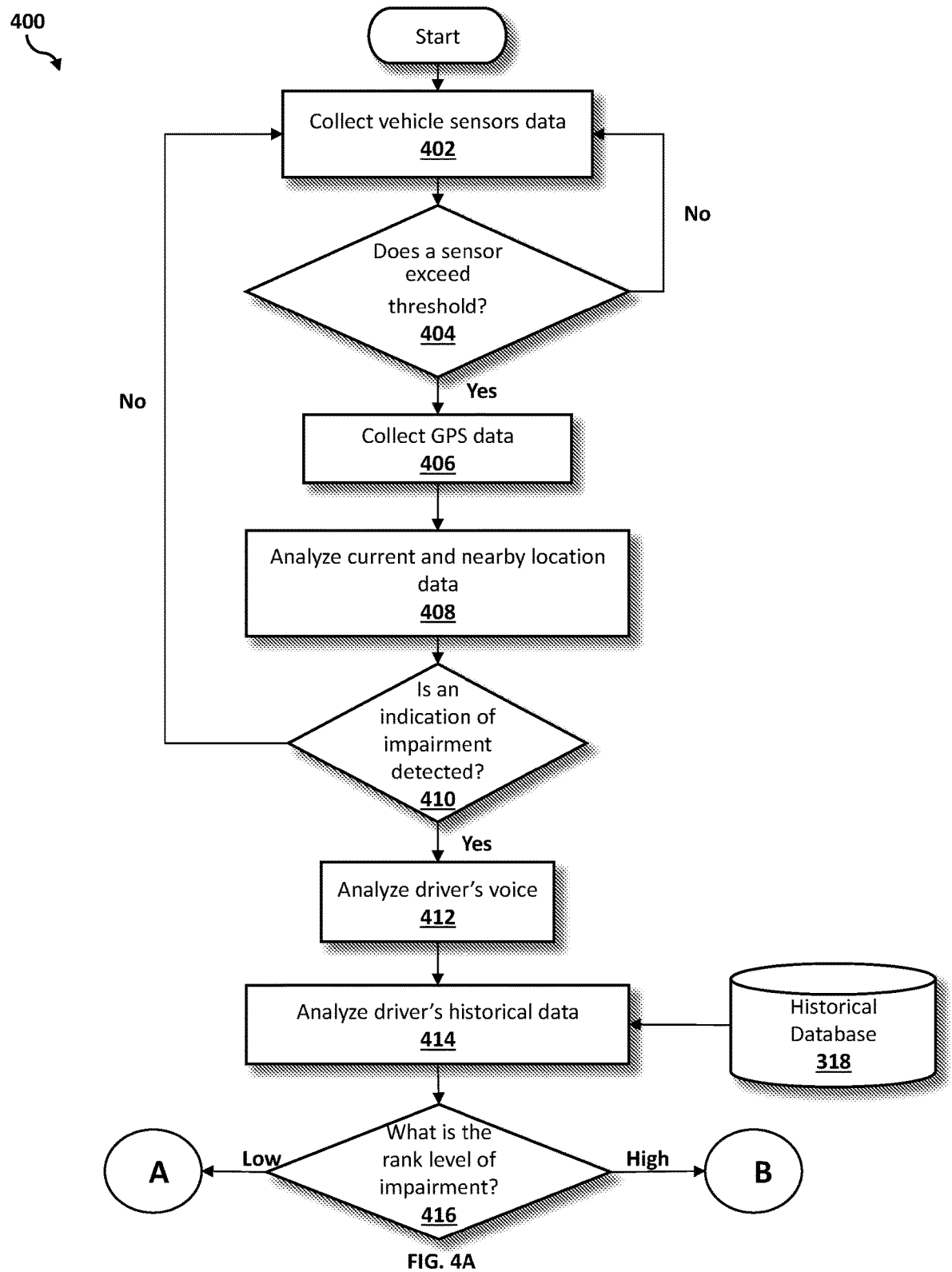
FIGS. 4A-4C are an operational flowchart illustrating an exemplary process for autonomous driver's behavior analysis according to at least one embodiment.

Referring now to FIG. 4A, an operational flowchart illustrating the exemplary autonomous driver's behavior analysis process 400 used by the autonomous driver's behavior analysis program 110a, 110b according to at least one embodiment is depicted.

At 402, the vehicle sensor data is collected. Using a software program 108 on the user device (e.g., user's computer 102), the vehicle sensor data (i.e., data from the existing vehicle sensors 204 and existing user device sensors 208) may be collected as input into the autonomous driver's behavior analysis program 110a, 110b via communications network 116, when the engine of the vehicle 202 has started. By utilizing sensors (i.e., existing vehicle sensors 204 and existing user device sensors 208) within the vehicle 202, the collection and verification of the vehicle sensor data associated with the driver's behavior may be initiated. The collected and verified vehicle sensor data associated with the driver's behavior may then be received by the autonomous driver's behavior analysis program 110a, 110b.

For example, Driver B is driving Vehicle B northbound on Main Street. Driver B's smart phone, which automatically synchronizes to Vehicle B, is located in Vehicle B. The autonomous driver's behavior analysis program 110a, 110b utilizes the existing sensors associated with Vehicle B, which includes speed signal, engine revolution per mile (RPM) signal, accelerator pedal position signal, anti-lock brake sensor, voice detector, sharp turn detection, surrounding object detection, steering angle and over correction signal, changing lane detection, crash sensor, front and back position sensors. Additionally, the autonomous driver's behavior analysis program 110a, 110b utilizes the existing proximity sensor, accelerator and gyroscope sensors associated with Driver B's smart phone (i.e., Smart Phone B) to collect data on Driver B's behavior.

In the present embodiment, the autonomous driver's behavior analysis program 110a, 110b may utilize existing vehicle sensors 204 (e.g., speed signal, engine RPM signal, accelerator pedal position signal, anti-lock brake sensor, voice detector, sharp turn detection, surrounding object detection, steering angle and over correction signal, changing lane detection, crash sensor, front and back position sensors) and existing user device sensors 208 (e.g., proximity sensor, accelerator and gyroscope sensors) to collect data on the driver's behavior.

Then, at 404, the autonomous driver's behavior analysis program 110a, 110b determines whether the threshold associated with the existing sensors has been exceeded. The autonomous driver's behavior analysis program 110a, 110b may analyze the collected vehicle sensor data to determine whether the data associated with the driver's behavior exceeds certain previously determined thresholds.

In the present embodiment, the autonomous driver's behavior analysis program 110a, 110b may utilize previously transmitted data, via communication network 116, associated with the normal range of behavior associated with a driver for each of the existing vehicle sensors 204 and existing user device sensors 208 (i.e., normal range data). The normal range data may be retrieved from the internet, and local authorities.

In another embodiment, the autonomous driver's behavior analysis program 110a, 110b may retrieve data associated with the specific driver's behavior, including past behaviors and driving patterns associated with the specific driver, from the historical database 318 (i.e., individual normal range data).

If the autonomous driver's behavior analysis program 110a, 110b determines that none of the sensors (i.e., existing user device sensors 208 and vehicle sensors 204) exceed a predefined threshold at 404, then the autonomous driver's behavior analysis program 110a, 110b returns to collecting vehicle sensors data at 402. Since none of the sensors exceed the predefined threshold, the driver's behavior may be within the normal range and therefore, the driver's behavior may fail to create a level of concern for possible driver impairment. Until the engine associated with the vehicle 202 is turned off, the autonomous driver's behavior analysis program 110a, 110b may continue to collect vehicle sensor data to detect any changes in the driver's behavior.

Continuing the previous example, the autonomous driver's behavior analysis program 110a, 110b analyzes the data collected from each of the sensors associated with Vehicle B and Smart Phone B to determine if the threshold associated with at least one of the sensors exceeds a predefined threshold. If none of the thresholds associated with the sensors have been exceeded, then the autonomous driver's behavior analysis program 110a, 110b continues to collect data.

If, however, the autonomous driver's behavior analysis program 110a, 110b determines that at least one of the sensors (i.e., existing user device sensors 208 and vehicle sensors 204) exceeds a predefined threshold at 404, then the global positioning system (GPS) and location tracking services data is collected at 406. The autonomous driver's behavior analysis program 110a, 110b may then utilize the GPS and location tracking services associated with the vehicle 202 to collect the GPS and location tracking services data.

Continuing the previous example, the vehicle sensor associated with the vehicle speed and lane change exceeds the threshold. Vehicle B is travelling 75 miles per hour on Main Street, which has a posted speed limit of 40 miles per hour. As such, the vehicle speed signal sensor indicates that Driver B is driving too fast. Additionally, the changing lane detection sensor indicates that Driver B changed lanes abruptly on three occasions within the last 10 minutes.

Then, at 408, the current and nearby location data is analyzed. The autonomous driver's behavior analysis program 110a, 110b may utilize the GPS and location tracking services data collected by the GPS and location tracking services associated with the vehicle 202 to analyze and verify the location of the driver. The autonomous driver's behavior analysis program 110a, 110b may determine the nearby locations (e.g., night clubs, lounges, bars and drinking activities and events) in close proximity to the driver. The current and nearby location data may be analyzed to determine the possibility that the driver may be impaired.

Continuing the previous example, the GPS and location tracking services associated with Vehicle B are initiated, and the current and nearby location data is collected and analyzed. Based on the current and nearby location data, Driver B is driving northbound on Main Street near a community with several night clubs and lounges, where alcoholic beverages are served. In addition, when Driver B started the engine for Vehicle B, Driver B was located in the parking lot of a popular grill and bar facility, and is now driving home at 7 PM, while Driver B left work at 4:45 PM.

Then, at 410, the autonomous driver's behavior analysis program 110a, 110b determines whether an indication of driver impairment is detected. After collecting and analyzing the vehicle sensor data, and current and nearby location data, the autonomous driver's behavior analysis program 110a, 110b may utilize a mathematical algorithm to evaluate the possibility of driver impairment.

If the autonomous driver's behavior analysis program 110a, 110b determines that no indication of driver impairment is detected at 410, then the autonomous driver's behavior analysis program 110a, 110b returns to collecting vehicle sensors data at 402.

Continuing the previous example, if the autonomous driver's behavior analysis program 110a, 110b determines that Driver B is not impaired, then the autonomous driver's behavior analysis program 110a, 110b may restart and continue to collect data from the Vehicle B sensors and Smart Phone B sensors.

If, however, the autonomous driver's behavior analysis program 110a, 110b determines that an indication of driver impairment is detected at 410, then the driver's voice is analyzed at 412. Since the autonomous driver's behavior analysis program 110a, 110b determines that there is a possibility of driver impairment, the autonomous driver's behavior analysis program 110a, 110b continues to analyze the driver's behavior to determine the extent of the driver's impairment. As such, the autonomous driver's behavior analysis program 110a, 110b first analyzes the voice of the driver. The autonomous driver's behavior analysis program 110a, 110b may utilize at least one voice analyzer algorithm to detect distortions in the voice of the driver that may indicate impairment. The autonomous driver's behavior analysis program 110a, 110b may, for example, request that the driver speak into an existing multimedia microphone device associated with the vehicle 202. The autonomous driver's behavior analysis program 110a, 110b may then detect the identification of the driver based on analyzing a prerecorded voice, and detect distortions in the driver's voice that may indicate impairment (e.g., slurring, stammering, poor word choices, cursing, delayed speech).

Continuing the previous example, the autonomous driver's behavior analysis program 110a, 110b detects that there is a possibility that Driver B may be impaired. As such, the autonomous driver's behavior analysis program 110a, 110b verbally prompts Driver B to speak using the existing speakers associated with Vehicle B, and then the autonomous driver's behavior analysis program 110a, 110b utilizes the voice analyzer and the prerecorded voice of Driver B to analyze Driver B's voice. However, the autonomous driver's behavior analysis program 110a, 110b failed to detect any distortions in Driver B's voice.

In the present embodiment, the autonomous driver's behavior analysis program 110a, 110b may upload the prerecorded voice via an existing multimedia microphone device associated with the vehicle 202. The autonomous driver's behavior analysis program 110a, 110b may utilize a computer display monitor existing in the vehicle 202. A screen may appear in which, for example, a "Settings" button is located on the bottom right side. Once the owner or operator of the vehicle 202 clicks on the "Settings" button, the owner or operator of the vehicle 202 may be prompted (e.g., via dialog box) to indicate the setting that the owner or operator of the vehicle 202 intends to change. In the list of settings, there may be a "Prerecorded Voice" button. If the owner or operator of the vehicle 202 clicks the "Prerecorded Voice" button, then the dialog box may expand with a "Start" button located at the middle of the dialog box. Once the owner or operator of the vehicle 202 selects the "Start" button, the screen may present a countdown timer from five to zero seconds and the owner or operator of the vehicle 202 may be prompted to talk for an allotted amount of time (e.g., 30 seconds) for the autonomous driver's behavior analysis program 110a, 110b to record the driver's voice. When the recording is completed, a simple indication (e.g., a red stop sign, a check mark) may appear in the dialog box. Then, the owner or operator of the vehicle 202 may be prompted, via another dialog box, to include the driver's identification information (e.g., name, whether the driver is the primary driver of the vehicle 202 and personal identifier information). The driver may click the "Submit" button at the bottom of the dialog box, when the driver enters the identification information. The dialog box may then expand and prompt the owner or operator of the vehicle 202 to confirm the driver's prerecorded voice and identification information by clicking the "Yes" or "No" buttons at the bottom of the dialog box. Once the vehicle owner or operator clicks "Yes," the dialog box may disappear. If, however, the vehicle owner or operator selects the "No" button, then the dialog box may remain for the owner or operator of the vehicle 202 to clarify the identification information or re-record the driver's prerecorded voice.

In the present embodiment, the autonomous driver's behavior analysis program 110a, 110b may include at least one prerecorded voice for each of the drivers associated with the vehicle 202. Additionally, there is no limit on the number of the drivers that may have at least one prerecorded voice on the autonomous driver's behavior analysis program 110a, 110b.

In another embodiment, the autonomous driver's behavior analysis program 110a, 110b may utilize an application program interface (API) on the portable user device 206 in which the driver may include a prerecorded voice and identification information. When the driver is located inside the vehicle 202 and the portable user device 206 associated with the driver is synchronized to the vehicle 202, the vehicle 202 may utilize the prerecorded voice and identification information on the portable user device 206 to determine whether the driver is impaired.

Then, at 414, the driver's historical data is analyzed. The autonomous driver's behavior analysis program 110a, 110b may retrieve historical data associated with the driver from the historical database 318. The retrieved historical data associated with the driver, stored in the historical database 318, may include previously analyzed data collected in similar situations to identify whether the driver is impaired. The autonomous driver's behavior analysis program 110a, 110b may analyze the driver's historical data to determine whether the driver is impaired based on previously analyzed data on the driver's past behaviors.

Continuing the previous example, the autonomous driver's behavior analysis program 110a, 110b attempts to retrieve historical data on Driver B in which Driver B was speeding and abruptly changing lanes with no voice distortion. However, the historical data on Driver B fails to show a similar event in the past.

Then, at 416, the autonomous driver's behavior analysis program 110a, 110b determines the ranking of the level of driver impairment. The autonomous driver's behavior analysis program 110a, 110b may utilize mathematical algorithms to analyze the data (e.g., GPS and location tracking services data, voice data associated with the driver, and historical data associated with the driver) collected and rank the level of driver impairment (e.g., low impairment or high impairment).

Figure 4B:
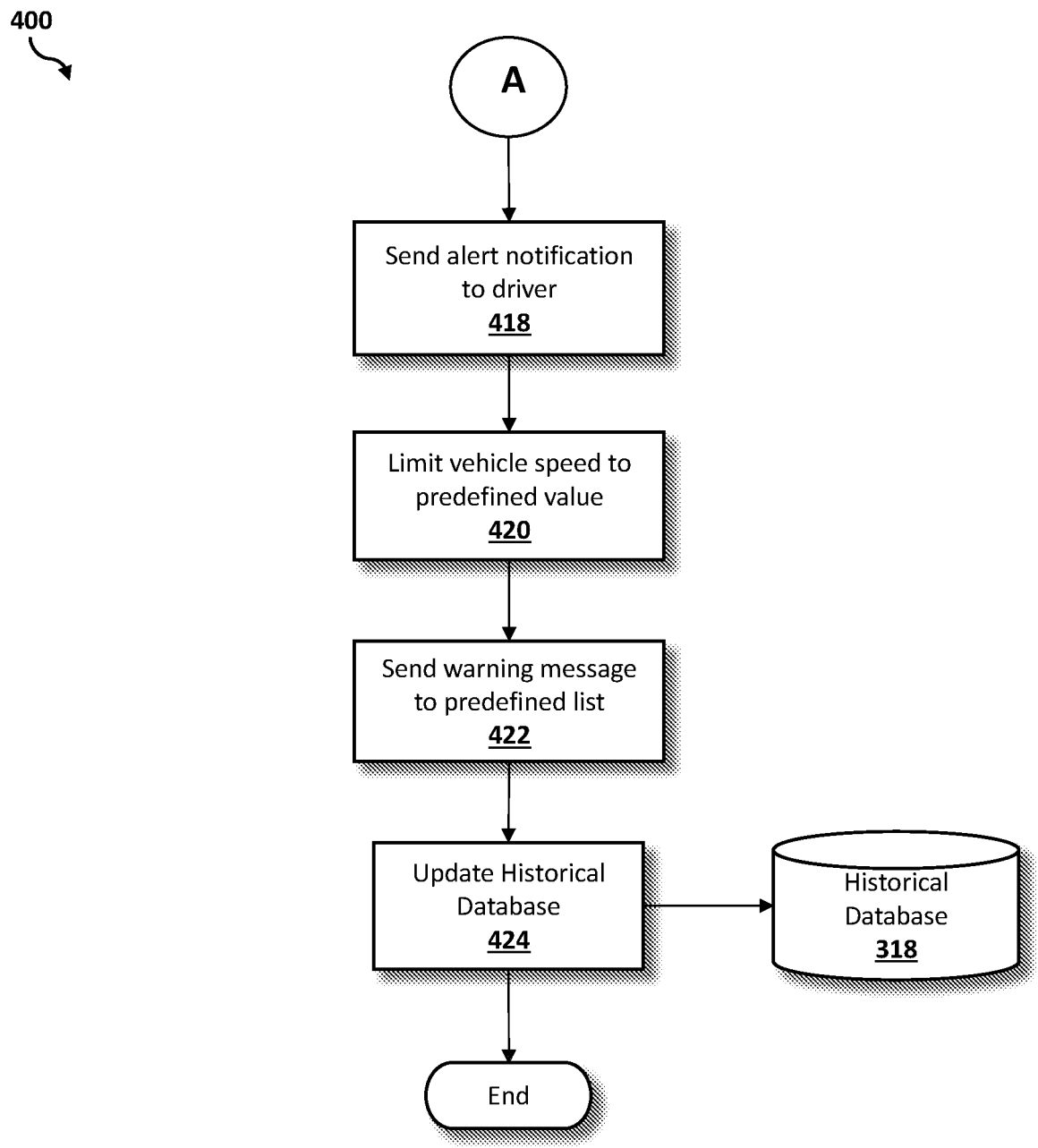

If the autonomous driver's behavior analysis program 110a, 110b determines that the ranking for the level of driver impairment is low at 416, then the autonomous driver's behavior analysis program 110a, 110b proceeds to FIG. 4B. If, however, the autonomous driver's behavior analysis program 110a, 110b determines that the ranking for the level of driver impairment is high at 416, then the autonomous driver's behavior analysis program 110a, 110b proceeds to FIG. 4C.

Figure 4C:
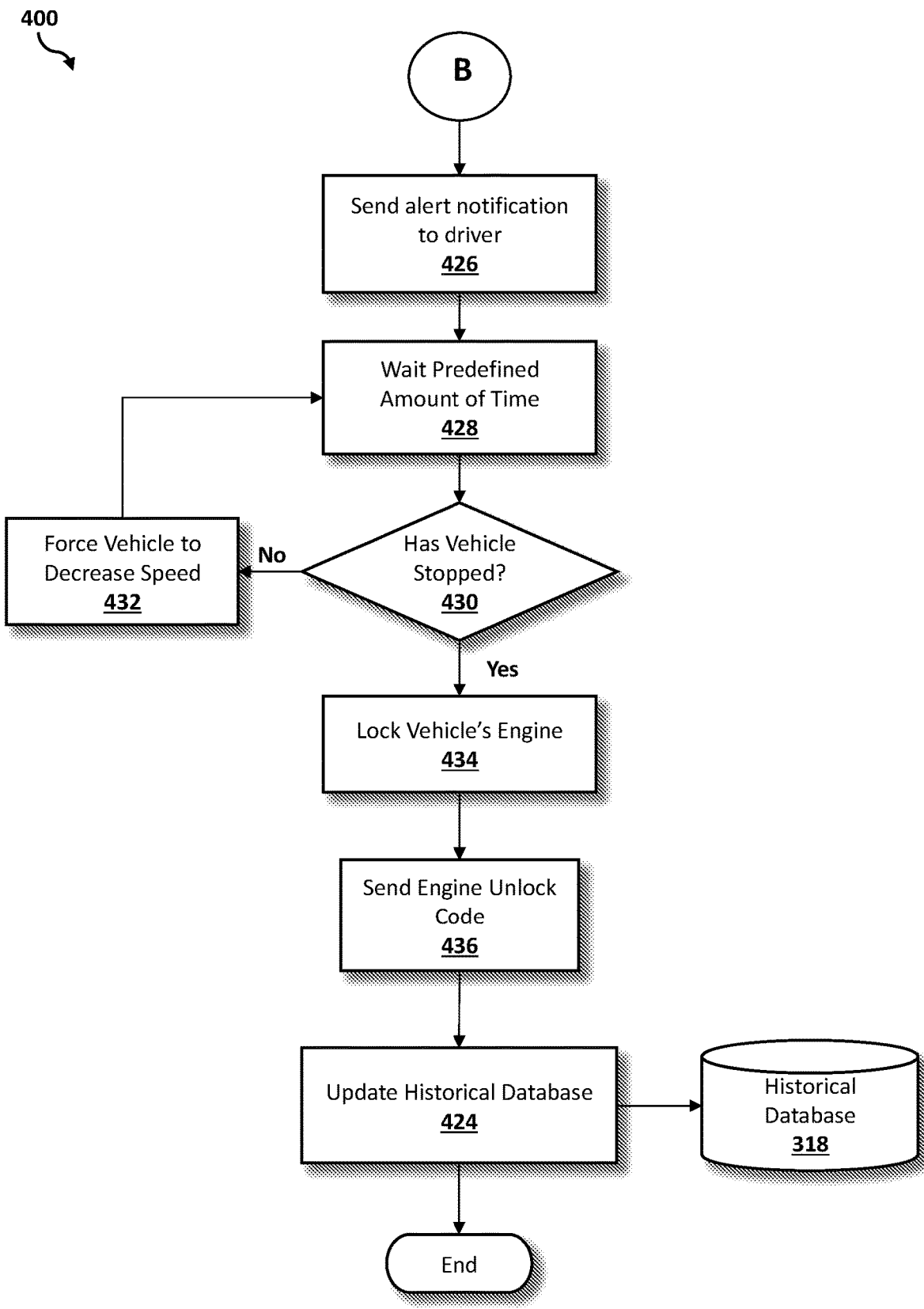

Continuing the previous example, the autonomous driver's behavior analysis program 110a, 110b ranks the level of driver impairment as high, and then the autonomous driver's behavior analysis program 110a, 110b proceeds to FIG. 4C.

Referring now to FIG. 4B, an operational flowchart illustrating the exemplary autonomous driver's behavior analysis process 400 used by the autonomous driver's behavior analysis program 110a, 110b according to at least one embodiment is depicted.

At 418, an alert notification is sent to the driver. When the autonomous driver's behavior analysis program 110a, 110b determines that the driver's level of impairment is low, the autonomous driver's behavior analysis program 110a, 110b may send an alert notification (i.e., warning message) to the driver through the vehicle's speakers. The alert notification may advise the driver that the autonomous driver's behavior analysis program 110a, 110b determines that the driver exhibits a low level of impairment.

Continuing the previous example, the autonomous driver's behavior analysis program 110a, 110b sends Driver B a verbal proactive alert notification warning Driver B that Driver B exhibits behavior indicative of a low level of impairment.

In another embodiment, the autonomous driver's behavior analysis program 110a, 110b may send a non-verbal alert notification (e.g., vibration of the steering wheel, flashing of the interior lights, and a written warning message displayed on the display computer monitor associated with the vehicle 202). The type of alert notification presented to the driver may depend on the specific manufacturer of the vehicle 202 and the existing vehicle sensors 204, or alert setting preferences configured by the user.

Then, at 420, the vehicle speed is limited to a predefined value. The autonomous driver's behavior analysis program 110a, 110b may then automatically limit the vehicle's speed to a predefined value.

Additionally, the autonomous driver's behavior analysis program 110a, 110b may have a default or standard predefined value. For example, the vehicle speed may, by default, be limited to 45 miles per hour.

Continuing the previous example, Driver B never changed the default predefined value to limit vehicle speed. Therefore, the autonomous driver's behavior analysis program 110a, 110b automatically limits the vehicle speed to 45 miles per hour.

In the present embodiment, the vehicle speed limit may be configurable. The autonomous driver's behavior analysis program 110a, 110b may utilize a computer display monitor existing in the vehicle 202. A screen may appear in which, for example, a "Settings" button is located on the bottom right side. Once the owner or operator of the vehicle 202 clicks on the "Settings" button, the owner or operator of the vehicle 202 may be prompted (e.g., via dialog box) to indicate the setting that the owner or operator of the vehicle 202 intends to change. In the list of settings, there may be an "Vehicle Speed Limit" button. If the owner or operator of the vehicle 202 clicks the "Vehicle Speed Limit" button, then the dialog box may expand with a comment box in which the owner or operator of the vehicle 202 may enter a numeric value for the vehicle speed limit to be implemented by the specific vehicle 202. The owner or operator of the vehicle 202 may select a "Submit" button under the comment box in the dialog box. The dialog box may expand and prompt the owner or operator of the vehicle 202 to confirm the vehicle speed limit by clicking the "Yes" or "No" buttons under a statement restating the entered vehicle speed limit. Once the vehicle owner or operator clicks "Yes," the dialog box may disappear. If, however, the vehicle owner or operator selects the "No" button, then the dialog box may remain for the owner or operator of the vehicle 202 to clarify the vehicle speed limit.

In the present embodiment, the autonomous driver's behavior analysis program 110a, 110b may adjust (e.g., increase or shorten) the vehicle speed limit depending on the posted speed limit of the roadway, the type of roadway (e.g., highway, residential streets), the current road conditions (e.g., slippery surface), current weather conditions (e.g., raining, snowing), and the number of other vehicles and pedestrians on the road (e.g., whether there are any parked vehicles on the shoulder, pedestrians crossing the street or walking along the shoulder, other vehicles driving in close proximity to the driver).

Then, at 422, a warning message is sent to a predefined list. The autonomous driver's behavior analysis program 110a, 110b may send a warning message, via communications network 116 (e.g., short message service (SMS)), to a predefined list of at least one preferred contact person to warn of the driver's low level of impairment. The autonomous driver's behavior analysis program 110a, 110b may utilize the portable user device 206 associated with the driver, when the portable user device 206 is connected to the multimedia system associated with the vehicle 202. Therefore, at least one of the driver's preferred contact people may contact the driver and potentially avoid a vehicle accident due to the driver's impairment.

Continuing the previous example, Driver B previously included Driver B's parents, younger brother and two of Driver B's close friends as preferred contact people for the predefined list. As such, the autonomous driver's behavior analysis program 110a, 110b sends a warning text message to Driver B's parents, younger brother and two of Driver B's close friends advising each of them that Driver B is exhibiting behavior indicative of low impairment.

In the present embodiment, the autonomous driver's behavior analysis program 110a, 110b may automatically generate a predefined list (i.e., predefined contact list) of at least one preferred contact person by utilizing the preferred contact person or people previously entered into the autonomous driver's behavior analysis program 110a, 110b by the driver. The driver may either manually enter the personal contact information for each preferred contact person, or upload the contact information for each preferred contact person from the portable user device 206 associated with the driver. To manually input the preferred contact person to the autonomous driver's behavior analysis program 110a, 110b, the driver may utilize a computer display monitor existing in the vehicle 202. A screen may appear in which, for example, a "Settings" button is located on the bottom right side. Once the owner or operator of the vehicle 202 clicks on the "Settings" button, the owner or operator of the vehicle 202 may be prompted (e.g., via dialog box) to indicate the setting that the owner or operator of the vehicle 202 intends to change. In the list of settings, there may be an "Action" button. If the owner or operator of the vehicle 202 clicks the "Action" button, then the dialog box may expand the list of possible actions that may be implemented by the specific vehicle 202. If the owner or operator of the vehicle 202 selects "Call or Text Friends/Relatives," then the dialog box may expand and prompt the owner or operator of the vehicle 202 to input the name, relationship, phone numbers and preferred means of communication (e.g., text message, call) for the driver's preferred contact person. The owner or operator of the vehicle 202 may enter at least one preferred contact person. The dialog box may expand and prompt the owner or operator of the vehicle 202 to confirm the preferred contact person by clicking the "Yes" or "No" buttons under a statement restating the entered preferred contact person. Once the vehicle owner or operator clicks "Yes," the dialog box may disappear. If, however, the vehicle owner or operator selects the "No" button, then the dialog box may remain for the owner or operator of the vehicle 202 to clarify the entered preferred contact person.

Alternatively, to upload each preferred contact person, the autonomous driver's behavior analysis program 110a, 110b may utilize the portable user device 206 (e.g., user's smart phone) associated with the driver. The autonomous driver's behavior analysis program 110a, 110b may utilize a computer display monitor existing in the vehicle 202. A screen may appear in which, for example, a "Settings" button is located on the bottom right side. Once the owner or operator of the vehicle 202 clicks on the "Settings" button, the owner or operator of the vehicle 202 may be prompted (e.g., via dialog box) to indicate the setting that the owner or operator of the vehicle 202 intends to change. In the list of settings, there may be an "Action" button. If the owner or operator of the vehicle 202 clicks the "Action" button, then the dialog box may expand the list of possible actions that may be implemented by the specific vehicle 202. If the owner or operator of the vehicle 202 selects "Call or Text Friends/Relatives," then the dialog box may expand and, at the bottom of the dialog box, there may be a "Upload" button. If the owner or operator of the vehicle 202 clicks the "Upload" button, then the contact list associated with the portable user device 206 (e.g., user's smart phone) may be uploaded onto the computer display monitor and another dialog box with the contact list on the portable user device 206 (e.g., smart phone) may appear on the computer display monitor. The owner or operator of the vehicle 202 may then click on each contact of the contact list on the portable user device 206 that the owner or operator of the vehicle 202 intends to include as a preferred contact person. Once the owner or operator of the vehicle 202 selects at least one preferred contact person, then the dialog box may disappear and the owner of operator of the vehicle 202 may be prompted (e.g., via dialog box) to include another preferred contact person or to close all dialog boxes.

In another embodiment, the autonomous driver's behavior analysis program 110a, 110b may detect other portable user devices 206 associated with the occupants of the vehicle 202 that are located in the vehicle 202. Therefore, if the driver entered multiple preferred contact people into autonomous driver's behavior analysis program 110a, 110b, the autonomous driver's behavior analysis program 110a, 110b may send a warning message to portable user devices 206 located outside of the vehicle 202. As such, if the autonomous driver's behavior analysis program 110a, 110b detects that one of the preferred contact people is also located in the vehicle 202 with the driver, the autonomous driver's behavior analysis program 110a, 110b may skip sending a warning message to the preferred contact person located in the vehicle 202 and may send warning messages to the other preferred contact people included on the driver's predefined list.

In another embodiment, the autonomous driver's behavior analysis program 110a, 110b may also include the current location of the driver of the vehicle 202 in the warning message to the predefined list of preferred contact people associated with the driver.

Then, at 424, the historical database 318 is updated. The autonomous driver's behavior analysis program 110a, 110b may gather the data associated with a specific event in which the autonomous driver's behavior analysis program 110a, 110b determined that the driver's behavior indicates a low level of impairment, and store the gathered data into the historical database 318. The stored data associated with the specific event may be indexed as a part of the driver's historical data that may be accessed and utilized for future analysis by the autonomous driver's behavior analysis program 110a, 110b. The autonomous driver's behavior analysis program 110a, 110b may then return to collecting vehicle sensor data at 402.

Continuing the previous example, the autonomous driver's behavior analysis program 110a, 110b stores the data collected to this event, including the fact that Driver B was speeding at 75 miles per hour and abruptly changed lanes three times within 10 minutes, the location that Driver B was driving from and towards, the time of day and date, the voice data, and the determination that Driver B was exhibiting behavior indicative of low impairment, in the historical database 318 associated with Driver B.

Referring now to FIG. 4C, an operational flowchart illustrating the exemplary autonomous driver's behavior analysis process 400 used by the autonomous driver's behavior analysis program 110a, 110b according to at least one embodiment is depicted.

At 426, an alert notification is sent to the driver. When the autonomous driver's behavior analysis program 110a, 110b determines that the driver's level of impairment is high, the autonomous driver's behavior analysis program 110a, 110b may send an alert notification (i.e., warning message) to the driver through the vehicle's speakers. The alert notification may advise the driver that the autonomous driver's behavior analysis program 110a, 110b determines that the driver exhibits a high level of impairment and the driver may be further advised to immediately pull over the vehicle.

Continuing the previous example, if the autonomous driver's behavior analysis program 110a, 110b determines that Driver B was exhibiting behavior indicative of a high level of impairment, then the autonomous driver's behavior analysis program 110a, 110b verbally alerts Driver B that Driver B is exhibiting behavior indicative of high impairment and Driver B must immediately pull over the vehicle.

In another embodiment, the autonomous driver's behavior analysis program 110a, 110b may send a non-verbal alert notification (e.g., vibration of the steering wheel, blinking hazard lights with sound, flashing of the interior lights, and a written warning message displayed on the display computer monitor associated with the vehicle 202). The type of alert notification presented to the driver may depend on the specific manufacturer of the vehicle 202 and the existing vehicle sensors 204, or alert setting preferences configured by the user.

Then, at 428, the autonomous driver's behavior analysis program 110a, 110b waits a predefined amount of time. The autonomous driver's behavior analysis program 110a, 110b may wait a predefined amount of time for the driver to pull the vehicle over as advised by the alert notification.

Additionally, the autonomous driver's behavior analysis program 110a, 110b may allot a certain amount of wait time for the vehicle to stop moving. By default, the driver may be given, for example, 30 seconds to stop the vehicle after the autonomous driver's behavior analysis program 110a, 110b sends the alert notification.

Continuing the previous example, Driver B never changed the default amount of wait time for Vehicle B to stop moving after the autonomous driver's behavior analysis program 110a, 110b alerts Driver B that Driver B has a high level of impairment and must immediately pull over Vehicle B. Therefore, Driver B has 30 seconds to pull over Vehicle B. Upon receiving the alert, Driver B immediately pulls over to the right shoulder on Main Street.

Alternatively, the wait time allocated for the vehicle to stop moving may be configurable. The autonomous driver's behavior analysis program 110a, 110b may connect to a computer display monitor. A screen may appear in which the "Settings" button is located on the bottom right side. Once the owner or operator of the vehicle 202 clicks on the "Settings" button, the owner or operator of the vehicle 202 may be prompted (e.g., via dialog box) to indicate the setting that the owner or operator of the vehicle 202 intends to change. In the list of settings, there may be a "Wait Time" button. If the owner or operator of the vehicle 202 clicks the "Wait Time" button, then the dialog box may expand the list of possible wait times ranging from 30 seconds to five minutes in increments of 15 or 30 seconds. The owner or operator of the vehicle 202 may select the preferred wait time. The dialog box may expand and prompt the owner or operator of the vehicle 202 to confirm the preferred wait time by clicking the "Yes" or "No" buttons under a statement restating the preferred wait time. Once the vehicle owner or operator clicks "Yes," the dialog box may disappear. If, however, the vehicle owner or operator selects the "No" button, then the dialog box may remain for the owner or operator of the vehicle 202 to clarify the preferred wait time.

In the present embodiment, the autonomous driver's behavior analysis program 110a, 110b may adjust (e.g., extend or shorten) the allotted wait time depending on whether the driver may be able to safely and legally stop the vehicle based on the surrounding location (e.g., whether there is a shoulder for the driver to pull off to the side of the road, or the traffic and road rules prohibits the driver from stopping the vehicle at that specific location), whether the driver's level of impairment is dangerously high thereby making immediately stopping the vehicle necessary, and whether the vehicle speed, number of other vehicles on the road, pedestrian traffic and location may pose a problem when the driver attempts to the stop the vehicle.

Then, at 430, the autonomous driver's behavior analysis program 110a, 110b determines whether the vehicle 202 has stopped. After the predefined amount of time expires, the autonomous driver's behavior analysis program 110a, 110b may verify whether the vehicle 202 has stopped (e.g., is no longer in motion and the transmission associated with the vehicle 202 is shifted into park). If the vehicle 202 has stopped, then the autonomous driver's behavior analysis program 110a, 110b may continue to shut down and lock the engine associated with the vehicle 202. If, however, the vehicle 202 is still in motion, then the autonomous driver's behavior analysis program 110a, 110b may send a reactive action by forcing the engine of the vehicle 202 to slow down the speed until the vehicle 202 has completely stopped.

If the autonomous driver's behavior analysis program 110a, 110b determines that the vehicle 202 has not stopped at 430, then the autonomous driver's behavior analysis program 110a, 110b will force the vehicle 202 to decrease speed at 432. If the vehicle 202 has not stopped after the predefined amount of time and remains in motion, the autonomous driver's behavior analysis program 110a, 110b may send a request to force the vehicle 202 to decrease the speed by 20%. After the autonomous driver's behavior analysis program 110a, 110b forces the vehicle 202 to decrease speed, then the autonomous driver's behavior analysis program 110a, 110b may wait a predefined amount of time at 428. If the autonomous driver's behavior analysis program 110a, 110b determines that the vehicle 202 is still in motion and the driver fails to stop the vehicle 202 after the predefined amount of time, once again, expires, then the autonomous driver's behavior analysis program 110a, 110b may once again send a request to force the vehicle 202 to decrease the speed by another 20%. The autonomous driver's behavior analysis program 110a, 110b may continue to wait the predefined amount of time and decrease the speed of the vehicle 202 by 20%, until the vehicle 202 is no longer in motion and the transmission associated with the vehicle 202 is shifted into park.

Continuing the previous example, if Driver B failed to pull over Vehicle B within 30 seconds of receiving the alert, the autonomous driver's behavior analysis program 110a, 110b would reduce Vehicle B's speed by 20% (i.e., 15 miles per hour) every 30 seconds until either Driver B fully stops Vehicle B, or the autonomous driver's behavior analysis program 110a, 110b has forced Vehicle B to come to a complete stop.

If, however, the autonomous driver's behavior analysis program 110a, 110b determines that the vehicle stopped at 430, then the autonomous driver's behavior analysis program 110a, 110b will lock the engine associated with the vehicle at 434. Once the vehicle 202 is no longer in motion and the transmission associated with the vehicle 202 is shifted into park, the autonomous driver's behavior analysis program 110a, 110b may lock the engine associated with the vehicle 202. Therefore, the driver may not be able to continue to drive the vehicle 202.

Continuing the previous example, since Driver B pulled over to the right shoulder on Main Street and fully stopped Vehicle B, the autonomous driver's behavior analysis program 110a, 110b locks the engine associated with Vehicle B (i.e., Engine B) and Driver B is no longer able to move Vehicle B.

Then, at 436, the autonomous driver's behavior analysis program 110a, 110b sends an engine unlock code to a predefined list. Once the autonomous driver's behavior analysis program 110a, 110b detects that the driver exhibits a high level of impairment and the vehicle 202 has stopped, the autonomous driver's behavior analysis program 110a, 110b may send a code for unlocking the engine associated with the vehicle 202 to at least one of the preferred contact people on the driver's predefined list. Therefore, the driver may not able to unlock the engine associated with the vehicle 202 and continue to drive without the code.

Continuing the previous example, the autonomous driver's behavior analysis program 110a, 110b sends the unlock engine code to Driver B's parents, younger brother and two of Driver B's close friends, who were included on Driver B's predefined list of preferred contact people. Therefore, Engine B will remain locked until the correct unlock engine code is used.

In the present embodiment, the unlock engine code may be entered into a computer display monitor connected to the autonomous driver's behavior analysis program 110a, 110b. Once the driver attempts to turn on the ignition associated with the vehicle 202, the driver may be prompted (e.g., via dialog box) to enter the unlock engine code. If the driver enters the correct unlock engine code, the engine associated with the vehicle may automatically start. If, however, the driver fails to enter the correct unlock engine code, the vehicle may not start.

Alternatively, depending on the specific manufacturer of the vehicle, the driver may verbally communicate the unlock engine code to the autonomous driver's behavior analysis program 110a, 110b, or enter the unlock engine code on another device located within the vehicle 202 or on the portable user device 206.

In the present embodiment, the autonomous driver's behavior analysis program 110a, 110b may simultaneously send an engine unlock code to a predefined list, while the autonomous driver's behavior analysis program 110a, 110b locks the engine associated with the vehicle 202. Therefore, as the autonomous driver's behavior analysis program 110a, 110b locks the engine associated with the vehicle 202, the autonomous driver's behavior analysis program 110a, 110b may also send the unlock engine code to the preferred contact people or person on the driver's predefined list.

In another embodiment, the autonomous driver's behavior analysis program 110a, 110b may detect other portable user devices 206 associated with the occupants of the vehicle 202 that are located in the vehicle 202. Therefore, if the driver entered multiple preferred contact people into the autonomous driver's behavior analysis program 110a, 110b, the autonomous driver's behavior analysis program 110a, 110b may send the engine unlock code to portable user devices 206 located outside of the vehicle 202. As such, if the autonomous driver's behavior analysis program 110a, 110b detects that one of the preferred contact people is also located in the vehicle 202 with the driver, the autonomous driver's behavior analysis program 110a, 110b may skip sending the engine unlock code to the preferred contact person located in the vehicle 202 and may send the engine unlock code to the other preferred contact people included on the driver's predefined list, thereby preventing the driver of the vehicle 202 from retrieving the engine unlock code from an occupant in the vehicle 202, and continuing to drive in an impaired state.

In another embodiment, the autonomous driver's behavior analysis program 110a, 110b may not restart the vehicle 202 (even with the proper code to unlock the engine), unless a new portable user device 206 (e.g., smart phone associated with a new driver) has been detected in the vehicle, or after a certain period of time (i.e., cooling period) has lapsed to prevent the driver of the vehicle 202 from retrieving the engine unlock code and continuing to drive in an impaired state.

In another embodiment, the autonomous driver's behavior analysis program 110a, 110b may have a default cooling period for the driver to wait based on guidelines and the law on how long a person may wait before operating a vehicle 202 again.

In another embodiment, the autonomous driver's behavior analysis program 110a, 110b may send the code to unlock the engine to the local authorities (e.g., police) if the driver exhibits an extremely high level of impairment, or when the driver has previously exhibited a high level of impairment.

After the autonomous driver's behavior analysis program 110a, 110b sends the engine unlock code, the autonomous driver's behavior analysis program 110a, 110b may update the historical database 318 at 424. The autonomous driver's behavior analysis program 110a, 110b may gather the data associated with a specific event in which the autonomous driver's behavior analysis program 110a, 110b determined that the driver's behavior indicates a high level of impairment, and store the gathered data into the historical database 318. The stored data associated with the specific event may be indexed as a part of the driver's historical data that may be accessed and utilized for future analysis by the autonomous driver's behavior analysis program 110a, 110b. Since the engine associated with the vehicle 202 is locked, the autonomous driver's behavior analysis program 110a, 110b may end until the engine associated with the vehicle is unlocked and restarted. At that point, the autonomous driver's behavior analysis program 110a, 110b may then return to collecting the vehicle sensors data at 402.

Continuing the previous example, the autonomous driver's behavior analysis program 110a, 110b stores the data collected to this event, including the fact that Driver B was speeding at 75 miles per hour and abruptly changed lanes three times within 10 minutes, the location that Driver B was driving from and towards, the time of day and date, the voice data, and the determination that Driver B was exhibiting behavior indicative of high impairment, in the historical database 318 associated with Driver B.

It may be appreciated that FIGS. 2-4C provide only an illustration of one embodiment and do not imply any limitations with regard to how different embodiments may be implemented. Many modifications to the depicted embodiment(s) may be made based on design and implementation requirements.

Figure 5:
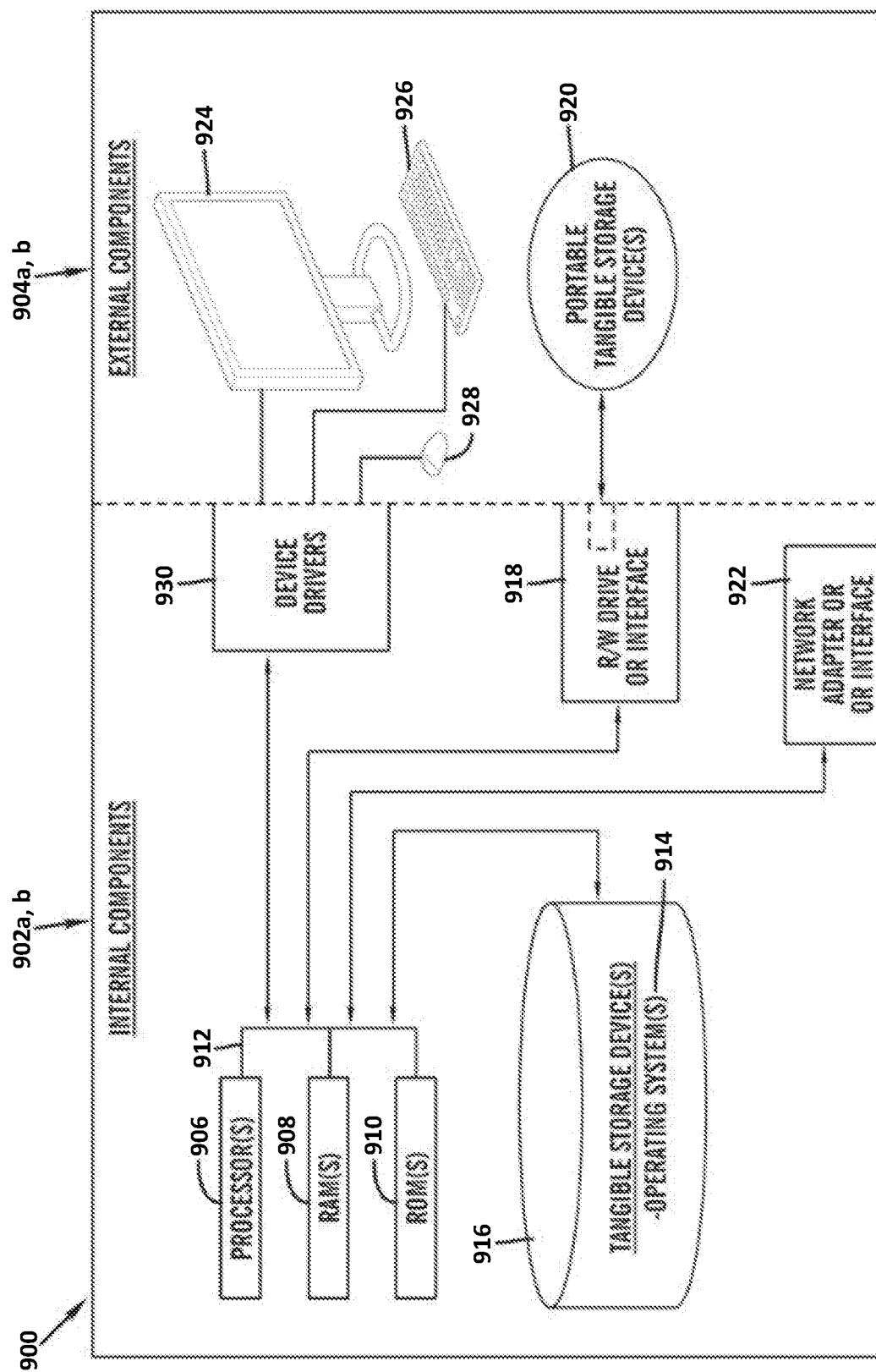
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the autonomous driver's behavior analysis program 110a in client computer 102, and the autonomous driver's behavior analysis program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the autonomous driver's behavior analysis program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the autonomous driver's behavior analysis program 110a in client computer 102 and the autonomous driver's behavior analysis program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the autonomous driver's behavior analysis program 110a in client computer 102 and the autonomous driver's behavior analysis program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
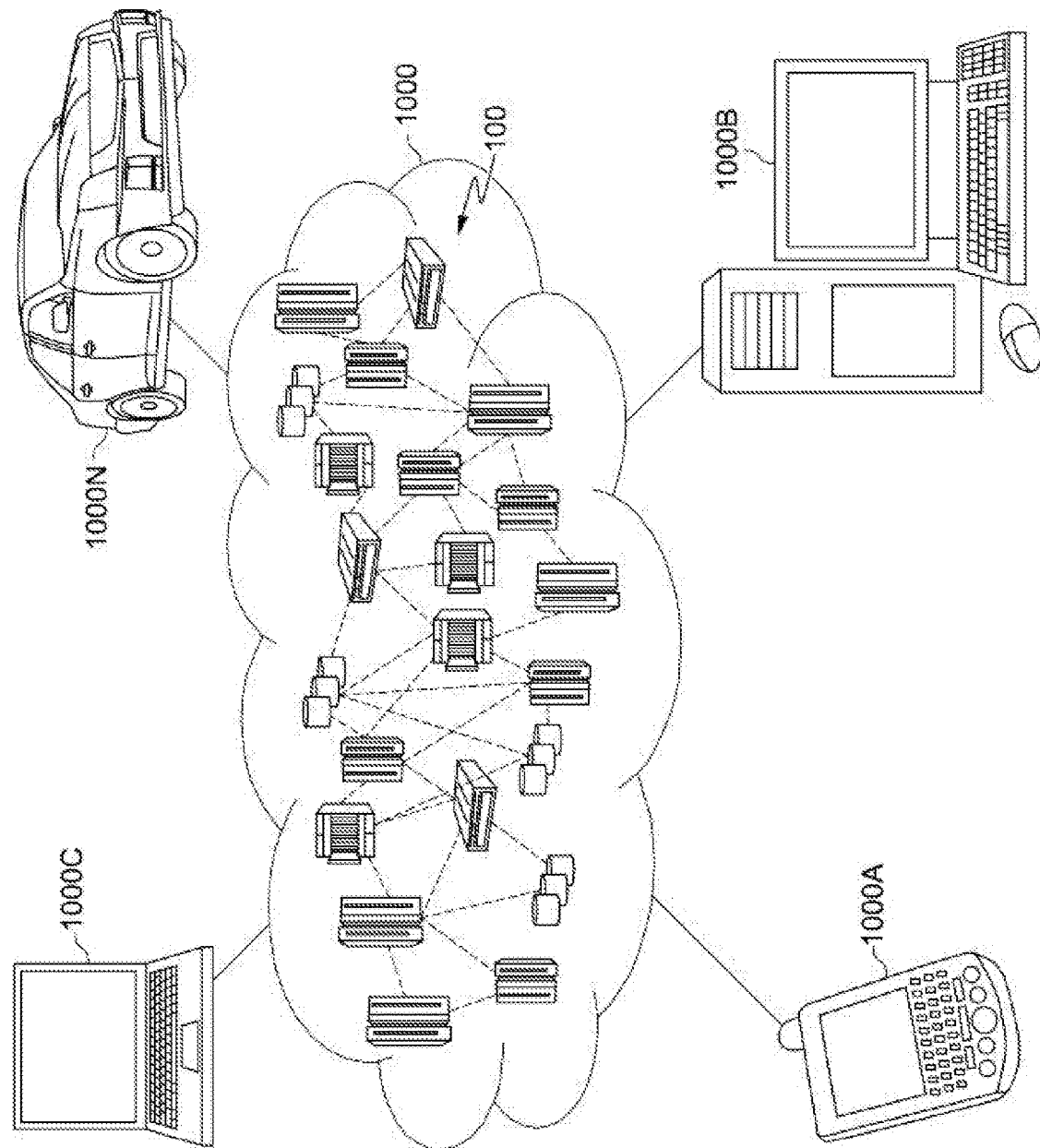
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
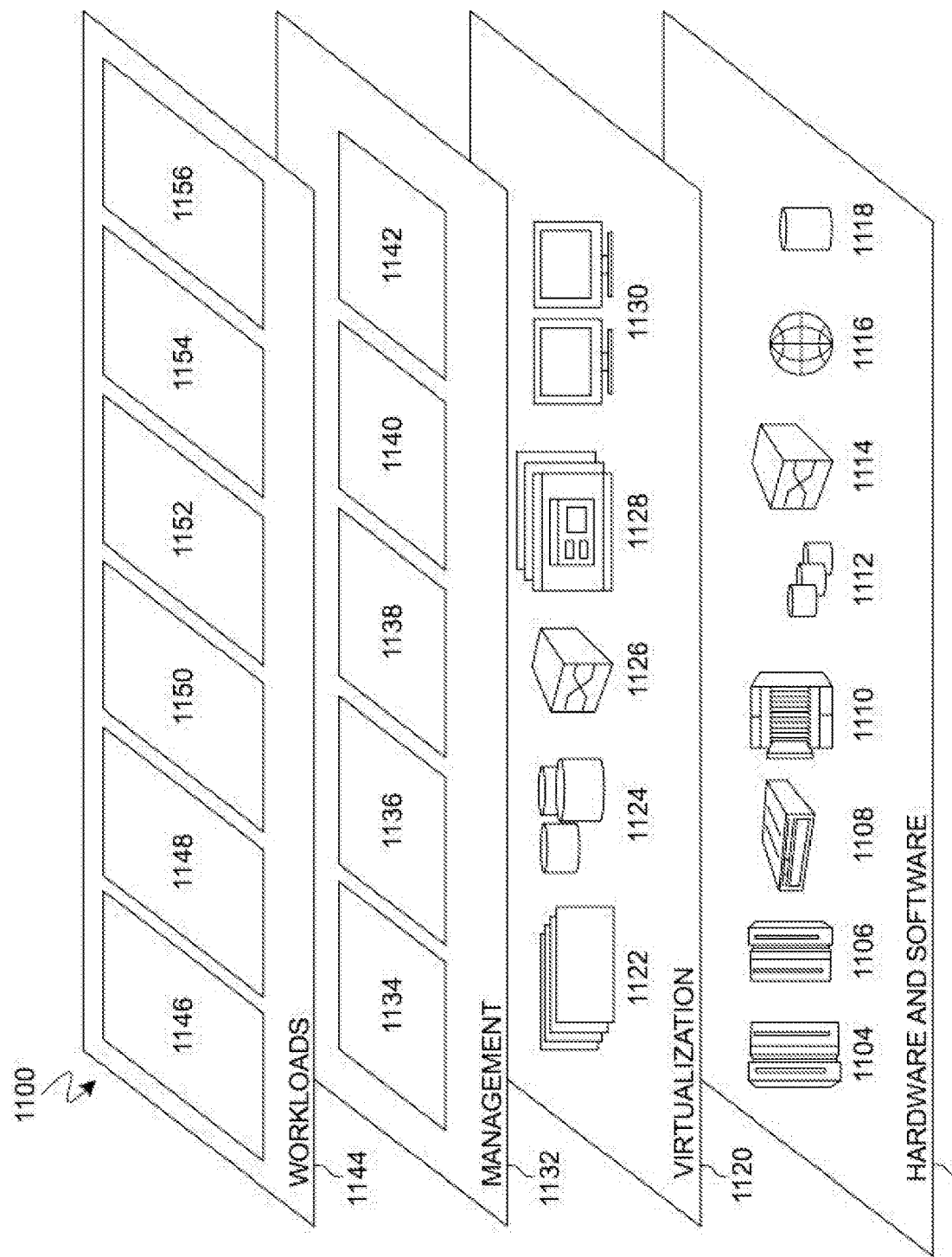
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and autonomous driver's behavior analysis 1156. An autonomous driver's behavior analysis program 110*a*, 110*b* provides a way to detect an impaired driver and trigger predefined actions to the vehicle operated by the impaired driver.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for implementing a plurality of actions related to an impaired driver's behavior to prevent vehicle accidents, the method comprising:

collecting, from a plurality of existing vehicle sensors and a plurality of existing portable user device sensors, a plurality of data related to a behavior of a driver while in a vehicle;

analyzing the collected plurality of data from the plurality of existing vehicle sensors and the plurality of existing portable user device sensors, wherein analyzing the collected plurality of data comprises analyzing a location of the vehicle and a plurality of nearby establishments related to an identified location of the vehicle;

determining an impairment state of the driver based on the analyzed plurality of data;

implementing the plurality of actions, based on the determined impairment state of the driver, to prohibit the driver from operating the vehicle in the determined impairment state, the plurality of actions are determined by the driver; and storing the implemented plurality of actions, the analyzed plurality of data from the plurality of existing vehicle sensors and the plurality of existing portable user device sensors, and the determined impairment state of the driver in a historical database.

2. The method of claim 1, wherein analyzing the collected plurality of data from the plurality of existing vehicle sensors and the plurality of existing portable user device sensors, further comprises:

determining whether a predefined threshold for at least one sensor related to the collected plurality of data from the plurality of existing vehicle sensors and the plurality of existing portable user device sensors is exceeded;

in response to determining that the threshold value for the at least one sensor is exceeded, collecting a plurality of global positioning system data and a plurality of location tracking services data to identify the location of the vehicle and the plurality of nearby establishments; and determining whether an indication of impairment is detected based on the collected plurality of global positioning system data, collected plurality of location tracking services data, identified location of the vehicle, and identified plurality of nearby establishments related to the identified location of the vehicle.

3. The method of claim 2, further comprising:

in response to detecting an indication of impairment, determining a ranking level of impairment of the driver by analyzing a plurality of historical data of the driver from the historical database and a current voice sample of the driver, wherein the analyzed current voice sample is compared to a prerecorded voice sample of the driver.

4. The method of claim 2, further comprising:

determining a lack of impairment of the driver; and continuing to collect, from the analyzed plurality of existing vehicle sensors and the analyzed plurality of existing portable user device sensors, the plurality of data of the driver of the vehicle.

5. The method of claim 3, further comprising:

identifying a level of impairment exhibited by the driver;

sending an alert notification to the driver based on the identified level of impairment exhibited by the driver, wherein the alert notification requests the driver immediately stop the vehicle;

waiting a predefined amount of time after sending the alert notification; and in response to determining that the driver fails to stop the vehicle, forcing the vehicle to decrease speed.

6. The method of claim 5, further comprising:

in response to determining that the driver stopped the vehicle, locking an engine of the vehicle; and sending an engine unlock code to unlock the engine of the vehicle to a predefined contact list, wherein the predefined contact list includes at least one preferred contact person of the driver.

7. The method of claim 3, further comprising:

identifying a level of impairment exhibited by the driver;

sending an alert notification to the driver based on the identified level of impairment exhibited by the driver, wherein the alert notification informs the driver of the identified level of impairment exhibited by the driver;

reducing a vehicle speed of the vehicle to a predefined value; and sending a warning message to a predefined contact list, wherein the predefined contact list includes at least one preferred contact person of the driver.

8. A computer system for implementing a plurality of actions related to an impaired driver's behavior to prevent vehicle accidents, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

collecting, from a plurality of existing vehicle sensors and a plurality of existing portable user device sensors, a plurality of data related to a behavior of a driver while in a vehicle;

analyzing the collected plurality of data from the plurality of existing vehicle sensors and the plurality of existing portable user device sensors, wherein analyzing the collected plurality of data comprises analyzing a location of the vehicle and a plurality of nearby establishments related to an identified location of the vehicle;

determining an impairment state of the driver based on the analyzed plurality of data;

implementing the plurality of actions, based on the determined impairment state of the driver, to prohibit the driver from operating the vehicle in the determined impairment state, the plurality of actions are determined by the driver; and storing the implemented plurality of actions, the analyzed plurality of data from the plurality of existing vehicle sensors and the plurality of existing portable user device sensors, and the determined impairment state of the driver in a historical database.

9. The computer system of claim 8, wherein analyzing the collected plurality of data from the plurality of existing vehicle sensors and the plurality of existing portable user device sensors, further comprises:

determining whether a predefined threshold for at least one sensor related to the collected plurality of data from the plurality of existing vehicle sensors and the plurality of existing portable user device sensors is exceeded;

in response to determining that the threshold value for the at least one sensor is exceeded, collecting a plurality of global positioning system data and a plurality of location tracking services data to identify the location of the vehicle and the plurality of nearby establishments; and determining whether an indication of impairment is detected based on the collected plurality of global positioning system data, collected plurality of location tracking services data, identified location of the vehicle, and identified plurality of nearby establishments related to the identified location of the vehicle.

10. The computer system of claim 9, further comprising:

in response to detecting an indication of impairment, determining a ranking level of impairment of the driver by analyzing a plurality of historical data of the driver from the historical database and a current voice sample of the driver, wherein the analyzed current voice sample is compared to a prerecorded voice sample of the driver.

11. The computer system of claim 9, further comprising:

determining a lack of impairment of the driver; and continuing to collect, from the analyzed plurality of existing vehicle sensors and the analyzed plurality of existing portable user device sensors, the plurality of data of the driver of the vehicle.

12. The computer system of claim 10, further comprising:

identifying a level of impairment exhibited by the driver;

sending an alert notification to the driver based on the identified level of impairment exhibited by the driver, wherein the alert notification requests the driver immediately stop the vehicle;

waiting a predefined amount of time after sending the alert notification; and in response to determining that the driver fails to stop the vehicle, forcing the vehicle to decrease speed.

13. The computer system of claim 12, further comprising:

in response to determining that the driver stopped the vehicle, locking an engine of the vehicle; and sending an engine unlock code to unlock the engine of the vehicle to a predefined contact list, wherein the predefined contact list includes at least one preferred contact person of the driver.

14. The computer system of claim 10, further comprising:

identifying a level of impairment exhibited by the driver;

sending an alert notification to the driver based on the identified level of impairment exhibited by the driver, wherein the alert notification informs the driver of the identified level of impairment exhibited by the driver;

reducing a vehicle speed of the vehicle to a predefined value; and sending a warning message to a predefined contact list, wherein the predefined contact list includes at least one preferred contact person of the driver.

15. A computer program product for implementing a plurality of actions related to an impaired driver's behavior to prevent vehicle accidents, comprising:

one or more computer-readable storage media and program instructions stored on at least one of the one or more tangible storage media, the program instructions executable by a processor to cause the processor to perform a method comprising:

collecting, from a plurality of existing vehicle sensors and a plurality of existing portable user device sensors, a plurality of data related to a behavior of a driver while in a vehicle;

analyzing the collected plurality of data from the plurality of existing vehicle sensors and the plurality of existing portable user device sensors, wherein analyzing the collected plurality of data comprises analyzing a location of the vehicle and a plurality of nearby establishments related to an identified location of the vehicle;

determining an impairment state of the driver based on the analyzed plurality of data;

implementing the plurality of actions, based on the determined impairment state of the driver, to prohibit the driver from operating the vehicle in the determined impairment state, the plurality of actions are determined by the driver; and storing the implemented plurality of actions, the analyzed plurality of data from the plurality of existing vehicle sensors and the plurality of existing portable user device sensors, and the determined impairment state of the driver in a historical database.

16. The computer program product of claim 15, wherein analyzing the collected plurality of data from the plurality of existing vehicle sensors and the plurality of existing portable user device sensors, further comprises:

determining whether a predefined threshold for at least one sensor related to the collected plurality of data from the plurality of existing vehicle sensors and the plurality of existing portable user device sensors is exceeded;

in response to determining that the threshold value for the at least one sensor is exceeded, collecting a plurality of global positioning system data and a plurality of location tracking services data to identify the location of the vehicle and the plurality of nearby establishments; and determining whether an indication of impairment is detected based on the collected plurality of global positioning system data, collected plurality of location tracking services data, identified location of the vehicle, and identified plurality of nearby establishments related to the identified location of the vehicle.

17. The computer program product of claim 16, further comprising:
in response to detecting an indication of impairment, determining a ranking level of impairment of the driver by analyzing a plurality of historical data of the driver from the historical database and a current voice sample of the driver, wherein the analyzed current voice sample is compared to a prerecorded voice sample of the driver.

18. The computer program product of claim 16, further comprising:
determining a lack of impairment of the driver; and
continuing to collect, from the analyzed plurality of existing vehicle sensors and the analyzed plurality of existing portable user device sensors, the plurality of data of the driver of the vehicle.

19. The computer program product of claim 17, further comprising:
identifying a level of impairment exhibited by the driver;
sending an alert notification to the driver based on the identified level of impairment exhibited by the driver, wherein the alert notification requests the driver immediately stop the vehicle;
waiting a predefined amount of time after sending the alert notification; and
in response to determining that the driver fails to stop the vehicle, forcing the vehicle to decrease speed.

20. The computer program product of claim 19, further comprising:
in response to determining that the driver stopped the vehicle, locking an engine of the vehicle; and
sending an engine unlock code to unlock the engine of the vehicle to a predefined contact list, wherein the predefined contact list includes at least one preferred contact person of the driver.

* * * * *